United States Patent
Omo et al.

(10) Patent No.: US 11,941,330 B2
(45) Date of Patent: Mar. 26, 2024

(54) MODELING NATURAL SPACE ENVIRONMENT EFFECTS ON HARDWARE

(71) Applicant: Raytheon Company, Tewksbury, MA (US)

(72) Inventors: Kalen K. Omo, Waipahu, HI (US); Derek J. Van Damme, Tucson, AZ (US); Dmitry A. Lyapustin, Tucson, AZ (US); Hillary Aigbe Omoigui, Jr., Tucson, AZ (US); Rondell J. Wilson, Vail, AZ (US)

(73) Assignee: Raytheon Company, Tewksbury, MA (US)

( * ) Notice: Subject to any disclaimer, the term of this patent is extended or adjusted under 35 U.S.C. 154(b) by 750 days.

(21) Appl. No.: 16/942,343

(22) Filed: Jul. 29, 2020

(65) Prior Publication Data

US 2022/0035964 A1 Feb. 3, 2022

(51) Int. Cl.
*G06F 30/20* (2020.01)
*G06F 119/02* (2020.01)

(52) U.S. Cl.
CPC .......... *G06F 30/20* (2020.01); *G06F 2119/02* (2020.01)

(58) Field of Classification Search
CPC ............................. G06F 30/20; G06F 2119/02
See application file for complete search history.

(56) References Cited

PUBLICATIONS

Reinaldo Perez Analysis and Simulations of Space Radiation-Induced Single-Event Effects and Transients Handbokk of Aerospace Electromagnetic Compatibility (Year: 2019).*
Eugence Normand Single-Event Effects in Avionics IEEE Transactions on Nyclear Science, vol. 43, No. 2, Apr. 1996 (Year: 1996).*
Weller et al. Monte Carlo Simulation of Single Event Effects IEEE Transactions on Nuclear Science, vol. 57, No. 4, Aug. 2010 (Year: 2010).*
Petersen, Edward, "Appendix B—Reference Equations", Single Event Effects in Aerospace, Wiley, (2011), 437-444.
Petersen, Edward, "Chapter 1—Introduction", Single Event Effects in Aerospace, Wilely, (2011), 1-12.

(Continued)

*Primary Examiner* — Rehana Perveen
*Assistant Examiner* — Cuong V Luu
(74) *Attorney, Agent, or Firm* — Schwegman Lundberg & Woessner, P.A.

(57) ABSTRACT

Discussed herein are devices, systems, and methods for determining whether to conduct a mission. A method can include partitioning, by processing circuitry configured to implement a model for determining a value representing a probability that operation of an electronic part of a device will be upset by a single event effect (SEE), a trajectory of the device into disjoint time segments. The method can include determining, based on an effective shielding of the device and one or more flux lookup tables (LUTs) for each of the time segments, respective SEE rates experienced by the electronic part for each time segment. The method can include determining, based on the determined respective SEE rates and using the model, the probability. The method can include permitting the device to traverse the trajectory only if the determined probability is less than a specified threshold.

20 Claims, 4 Drawing Sheets

(56) References Cited

PUBLICATIONS

Petersen, Edward, "Chapter 10—Upsets Produced by Heavy Ion Nuclear Reactions", Single Event Effects in Aerospace, Wiley, (2011), 337-343.

Petersen, Edward, "Chapter 11—Samples of Heavy Ion Rate Prediction", Single Event Effects in Aerospace, Wiley, (2011), 345-370.

Petersen, Edward, "Chapter 12—Samples of Proton Rate Predictions", Single Event Effects in Aerospace, Wiley, (2011), 371-374.

Petersen, Edward, "Chapter 13—Combined Environments", Single Event Effects in Aerospace, Wiley, (2011), 375-387.

Petersen, Edward, "Chapter 2—Foundations of Single Event Analysis and Prediction", Single Event Effects in Aerospace, Wiley, (2011), 13-76.

Petersen, Edward, "Chapter 3—Optimizing Heavy Ion Experiments for Analysis", Single Event Effects in Aerospace, Wiley, (2011), 77-102.

Petersen, Edward, "Chapter 7—Cosmic Ray Single Event Rate Calculations", Single Event Effects in Aerospace, Wiley, (2011), 251-303.

Petersen, Edward, "Chapter 8—Proton Single Event Rate Calculations", Cosmic Ray Single Event Rate Calculations, Wiley, (2011), 305-328.

\* cited by examiner

MODELING NATURAL SPACE ENVIRONMENT EFFECTS ON HARDWARE

TECHNICAL FIELD

Embodiments discussed herein regard devices, systems, methods, and machine-readable mediums for evaluating effects of positively and negatively charged particles on hardware in space. More specifically, embodiments provide an ability to model Single Event Effects (SEEs) at multiple hardware levels over time.

BACKGROUND

The phrase "natural space environment" (NSE) refers to the environment as it occurs independent of the presence of most manmade objects. The NSE includes naturally occurring items, such as atomic oxygen (AO), atmospheric density, ionizing radiation, plasma, or the like. The NSE can include a manmade factor, such as orbital debris.

Major constituents of Earth's atmosphere are generally constant up to an altitude of about ninety (90) kilometers (km). Beyond this, the effects of particles in the Earth's atmosphere on a device are variable and difficult to predict. These particles can transfer kinetic energy to a component (e.g., an electronic component) through contact or other interaction. This kinetic energy can include decreased power production by a solar array, failure of an electronic component, increased noise in the electronic components, or the like. With the decrease in size of transistors and other electronic components, these electronic components are increasingly sensitive to lower amounts of this kinetic energy.

SEEs are caused by a single, energetic particle and can result in soft errors (sometimes called Single Event Upsets (SEUs)) or hard errors. Soft errors are non-destructive (physically, but not necessarily non-destructive operationally). SEUs normally appear as transient pulses in logic or other circuitry or as bitflips in memory or a register. Hard errors are potentially destructive physically and can manifest as an increased operating current (sometimes called a Single Event Latchup (SEL)), burnout, gate rupture, frozen bits, or noise. Increased ability to understand effects of SEEs on electronics is desired.

DETAILED DESCRIPTION

Embodiments provide methods, systems, devices, and computer-readable media for determining a probability whether operation of a device will be upset ($P_{UPSET}$) by a SEE during operation. Embodiments improve upon prior techniques that only provide an effect of a SEE for an individual slice of time. Embodiments can leverage existing flux LUTs, Weibull curves, RPP, parts timelines, pars models, shielding models, or the like to determine $P_{UPSET}$ for a variety of levels (e.g., component, board (collection of components), device (collection of one or more boards or components), or the like) of a device.

Embodiments can further leverage subject matter expert (SME) knowledge regarding when a component is powered on and is powered off (parts timelines) to more accurately determine $P_{UPSET}$. Embodiments can help device designers alter the design to withstand SEEs. Embodiments can help a mission planner choose a trajectory for the device that increases mission success. Embodiments can help identify design problems at different device levels. Other advantages of embodiments can be realized.

Any entity that has sent a device into the ionosphere or higher altitude has likely realized the importance of accurately estimating SEE effects on the device. Such entities include the military, National Aeronautics and Space Administration (NASA), and private companies, such as SpaceX, among others. As previously discussed, estimating SEE effects on the device using current methods is difficult, time consuming, and largely not informative enough. This is because prior SEE effect analyses provide $P_{UPSET}$ for only a single component at a single time.

Figure 1:
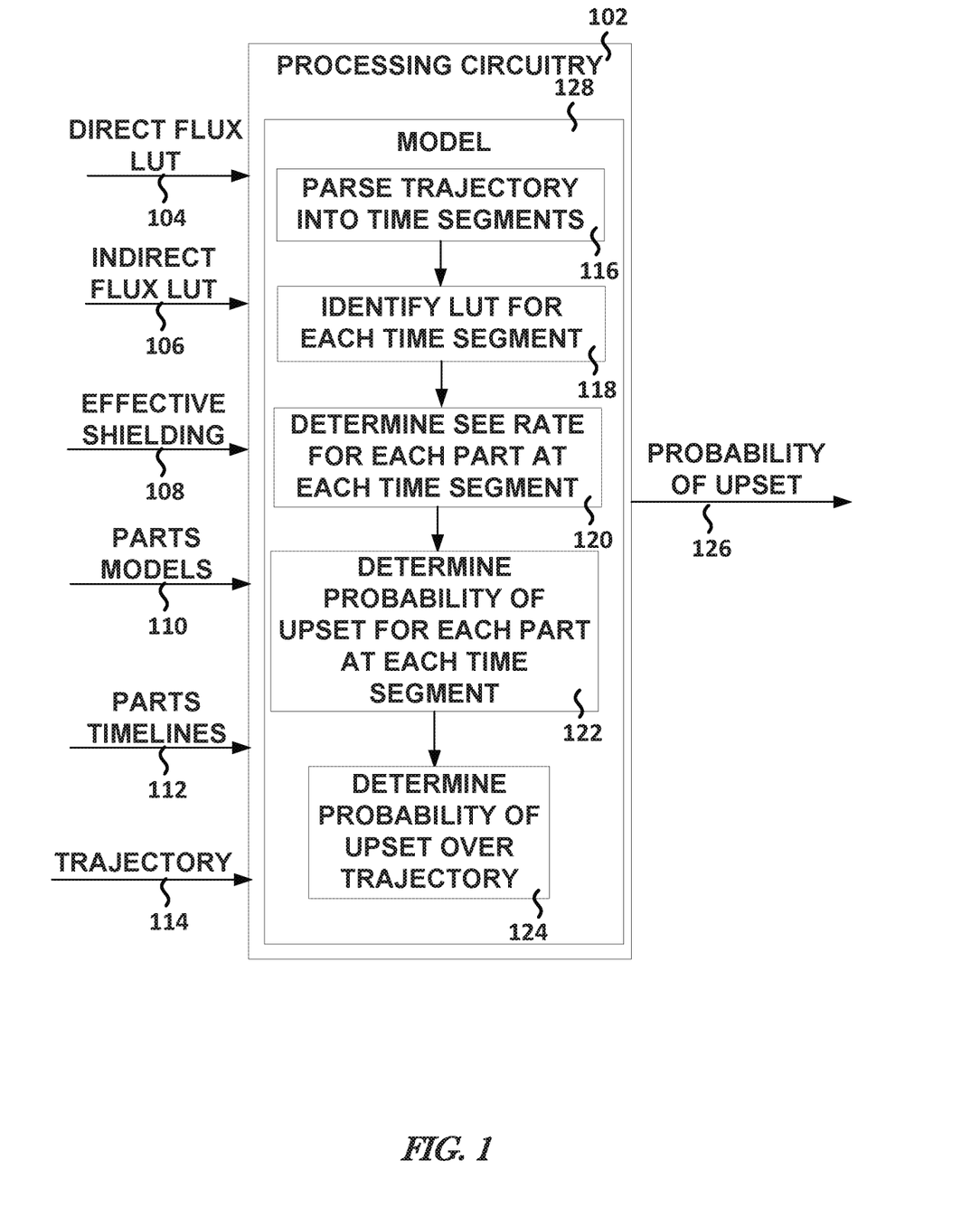
FIG. 1 illustrates, by way of example, a diagram of an embodiment of a model for SEE simulation.

FIG. 1 illustrates, by way of example, a diagram of an embodiment of a model 128 for SEE simulation. The model 128 can be implemented using processing circuitry 102. The model 128 can help overcome one or more of the problems of prior SEE simulations previously discussed. The model 128 as illustrated takes one or more flux lookup tables (LUTs) (e.g., direct flux LUT 104 or indirect flux LUT 106), shielding effects 108, parts models 110, parts timelines 112, and a trajectory 114 as input and produces $P_{UPSET}$ 126 as output.

The processing circuitry 102 can include one or more electric or electronic components configured to implement the model 128. The electric or electronic components can include one or more transistors, resistors, capacitors, diodes, inductors, logic gates (e.g., AND, OR, XOR, negate, buffer, or the like), switches, oscillators, power supplies, memory devices, amplifiers, processing units (e.g., a central processing unit (CPU), filed programmable gate array (FPGA), application specific integrated circuit (ASIC), graphics processing unit (GPU), or the like), among others, The direct flux LUT 104 and the indirect flux LUT 106 include Linear Energy Transfer (LET) per spatial dimension (e.g., in terms of latitude, longitude, global positioning system (GPS), universal transverse Mercator (UTM), altitude, a combination thereof, or the like) covered by the LUT. The direct flux LUT 104 details ions by LET and flux which can cause direct effects while the indirect flux LUT 106 details ions by LET and flux which can indirect effects. Examples of direct and indirect effects include bit upsets, latch-ups, gate ruptures, burnouts and others. Indirect and direct effects result in similar phenomena, but the underlying physics which cause them are different and at different rates of occurrence. Therefore, they are accounted for separately.

LET is the average energy transfer per unit path length along the path of an ionizing particle. The LET is a factor in determining the consequences of the energy transfer. In general, a high LET attenuates energy more quickly. Effective shielding is generally more effective to help prevent deeper component penetration of a high LET as compared with a lower LET. A higher concentration of deposited energy can cause more severe damage to structures near the path of the particle. Mathematically, LET is the energy loss of the charged particle due to electronic collisions while traversing a path.

There are a variety of flux LUT generation techniques. Some examples include those implemented by CRÈME-96 (Cosmic Ray Effects on Micro-Electronics (1996 revision)) from Vanderbilt University, OMERE from TRAD Tests & Radiations, and SIRE (Space Ionization Radiation Environment) from Fifth Gait Technologies.

The effective shielding 108 can be expressed by a mathematical model. Effective shielding 108 is often expressed using Monte Carlo N Particles Transport (MCNP). MCNP was designed by Los Alamos National Laboratory to track particles of varying energies.

The parts models 110 indicate the shielding parameters, interconnections between parts of the device, locations of the parts within the device, or the like. The parts models 110 define sufficient structure to determine whether, given the LUT 104, 106 and shielding effects 108, how many SEEs will be realized. More details regarding the parts models 110 are provided regarding FIG. 2.

The parts timelines 112 indicate when a part will be on and when a part will be off in the trajectory 114. The parts timelines 112 can help more accurately determine how many SEEs will be realized. This is because, when a part is off, it does not create a SEE even though the conditions indicated by the LUT 104, 106, shielding effects 108, or parts models 110 indicate that the part will experience the SEE.

The trajectory 114 indicates the device motion through a region. The trajectory 114 can specify an origin 214 and destination 216 (see FIG. 2) to be traversed by a device 202 (see FIG. 2). The trajectory 114 can specify coordinates traversed by the device 202 between the origin 214 and the destination 216. The coordinates can include (x, y, z) or similar coordinates that indicate generally altitude and projected location on the ground (e.g., nadir).

The model 128 can perform operations for determining $P_{UPSET\_TOTAL}$ 126. The operations can include parsing the trajectory into time segments, at operation 116; identifying a corresponding LUT for each time segment, at operation 118; determining a SEE rate for each part at each time segment, at operation 120; determining $P_{UPSET}$ for each part at each time segment, at operation 122; and determining $P_{UPSET}$ over the trajectory for each part, board, or the device, at operation 124.

The operation 116 can include partitioning the trajectory into disjoint time segments. As LETs are a function of time, a simplification of determining $P_{UPSET}$ can be determined by partitioning the trajectory into equal time segments. Disjoint means that no part of the trajectory is included in multiple time segments. The size of the time segments can be determined, for example, by a size of a region covered by the LUT, the speed of the device, or the like.

The operation 118 can include determining which LUTs 104, 106 (one or more) apply to the device 202 for each time segment. The LUTs 104, 106 can be specified for a range of Earth's surface (x, y), and altitude (z). The LUTs 104, 106 that apply at each time segment are determined based on the operational properties of the device that affect the location of the device.

Figure 2:
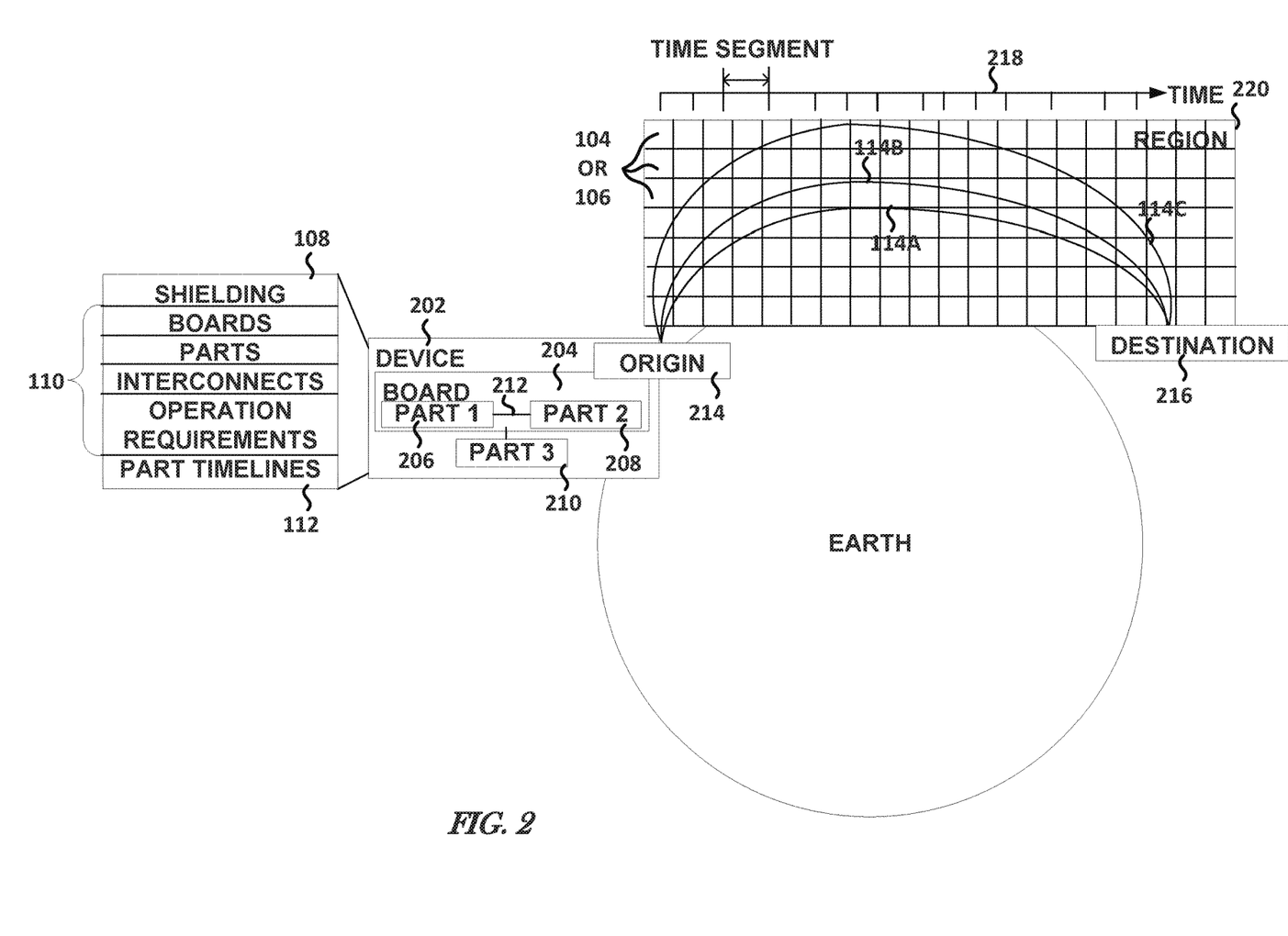
FIG. 2 illustrates, by way of example, a diagram of an embodiment of a system for natural space environment effects modeling.

The operation 120 can include using the LUTs 104, 106 identified at operation 118, effective shielding 108 (e.g., specified by MCNP), or the parts timelines 112 to determine the SEE rate for a part ($SEE\_RATE_{PART\_TIME}$) for a given time segment 218 (see FIG. 2). The LUTs 104, 106, effective shielding 108, and parts timelines 112 can be used as input to a SEE rate function. An example of a SEE rate function is Rectangular Parallelpiped (RPP). An assumption can be made that a SEE is realized when a charge deposited by an ion exceeds a critical charge threshold. The number of SEEs can be determined using RPP based on this assumption. RPP can be determined using Equation 2:

$$N = S/4 \int_{L_{0,w}}^{\infty} w(L_w) \int_{L_0}^{L_{MAX}} I(L) C\left(\frac{L_w}{L}a\right) dL dL_w$$

where S is surface area device's sensitive volume, $L_{0,w}$ is the LET threshold of the Weibull function, $w(L_w)$ is the differential Weibull function, $L_0$ is $L_w a/s_{max}$, a is depth of the device's sensitive volume, $s_{max}$ is the maximum path length through the sensitive volume, $L_{MAX}$ is the maximum LET in environment, $I(L)$ is the differential LET spectrum, $$C\left(\frac{L_w}{L}a\right)$$

is the integral chord length distribution of the sensitive volume. This is just one example of determining SEE rate and other techniques are within the scope of this disclosure.

Device upset curves determined based on the Weibull integral function can be in the RPP to determine SEE rate at operation 120. The Weibull distribution is defined by Equation 2:

$$F(L) = 1 - e^{-\left[\frac{L-L_0}{W}\right]^s} \text{ for } L > L_0; 0 \text{ else}$$

Where L is the LET, $L_0$ is the LET threshold, W is a width parameter, and s is a shape parameter. The LET, adjusted by the shielding effects 108 can be used as input into the Weibull distribution function.

If a part is not powered on during a specified time segment 218 (see FIG. 2), as defined by the parts timelines 112, the SEE rate can be determined to be zero (0) and the SEE rate does not need to be determined using the provided SEE rate functions. If a part is only powered on for a portion of a time segment, the SEE rate determined can be scaled by fraction of time the part will be on during the time segment to the total time of the time segment.

The operation 122 can include converting the SEE rate determined at operation 120 to determine $P_{UPSET}$. $P_{UPSET}$ can be related to the SEE rate by the exponential function as in Equation 3:

$$P_{UPSET} = e^{-(SEE\ RATE_{PART\_TIME})}$$

The $P_{UPSET}$ determined by Equation 3 is for a specified part at a specified time. At operation 124, the $P_{UPSET}$ for a specified part at a specified time can be mathematically combined (e.g., summed) with $P_{UPSET}$ for the same part at other times to determine $P_{UPSET}$ for the part across the trajectory 114 ($P_{UPSET\_PART}$). The relationship between $P_{UPSET\_PART}$ and $P_{UPSET}$ is provided in Equation 4:

$$P_{UPSET\_PART} = \sum_{t=k}^{l} P_{UPSET}$$

Where k is the time segment corresponding to the device 202 (see FIG. 2) at the origin 214 (see FIG. 2) and/is the time segment corresponding to the device 202 at the destination 216 (see FIG. 2).

$P_{UPSET}$ for different parts can then be mathematically combined (e.g., by a sum, weighted sum (weighted based on importance of part to mission criticality, device operation, or the like), or the like), at operation 124 to determine $P_{UPSET\_TOTAL}$ 126 for a subset of the parts of the device, or the whole device. $P_{UPSET\_TOTAL}$ 126 can be mathematically represented by Equation 5:

$$P_{UPSET\_TOTAL} = \sum_{PART\,1}^{PART\,n} P_{UPSET\_PART}$$

Where n is the number of parts on the board, device, or the like.

The $P_{UPSET\_TOTAL}$ 126 can inform a device designer regarding whether the entire device is likely to survive traversing the trajectory 114, parts of the device that are more or less susceptible to SEE, or the like. The device designer can re-design the device until $P_{UPSET\_TOTAL}$ 126 is less than a threshold, such as for a specified percentage of the trajectories. The $P_{UPSET\_TOTAL}$ 126 can inform a mission planner on a trajectory to take to increase mission success. For example, the mission planner can receive $P_{UPSET\_TOTAL}$ 126 for a variety of different trajectories that are sufficient to complete the mission. The mission planner can choose the trajectory with less than a threshold $P_{UPSET\_TOTAL}$ 126 and satisfies other factors for mission success.

The operation of the model 128 is easily parallelizable. The model operations for each part at each time segment can be performed on different threads of a parallel computing machine (e.g., a High-Performance Computing (HPC) machine). The prior techniques for SEE rate determination and $P_{UPSET\_TOTAL}$ 126 determination are not easily parallelizable.

FIG. 2 illustrates, by way of example, a diagram of an embodiment of a system 200 for natural space environment effects modeling. The system 200 as illustrated includes a device 202 that is to be sent to a destination 216 from an origin 214. A trajectory 114A, 114B, 114C of the device 202 enters a region 220 of space in which natural space environment effects can alter the operation of the device 202 more than on the surface of Earth. The region 220 can be at an altitude of the ionosphere or further from the surface of the Earth. An entity can need to know whether the device 202 will survive a traverse of the trajectory 114A-114C before the device 202 is allowed to leave the origin 214. As used herein "or" is to be understood in the inclusive sense. For example, "A or B" means one from the set {"A", "B", "A and B"}.

The device 202 can include any electronic device that is to travel from the origin 214 to the destination 216. Examples of the device 202 can include a missile, a missile interceptor, an intelligence, surveillance, reconnaissance (ISR) device, satellites, boost vehicles, resident space craft or the like. The device 202 includes corresponding description data that can be provided to the processing circuitry 102 to be used as input to the model 128. The description data of FIG. 2 includes the shielding 108, the parts model 110, and the parts timelines 112. The shielding 108, the parts model 110, and the parts timelines are discussed regarding FIG. 1.

The parts model 110 can include data indicating boards 204 of the device (if any). The parts model 110 can include data indicating parts 206, 208, 210 on the boards 204 and off the boards 204. The parts model 110 can include data indicating interconnects 212 between the parts 206, 208, 210 or the boards 204. The parts model 110 can include data indicating operation requirements of the device 202. The operation requirements can include voltage ranges, current ranges, power ranges, type of voltage or current (alternating or direct), range of frequencies, or other operation requirements of the device 202. The operation requirements can include valid operation ranges for each part. The operation requirements can include invalid operation ranges for each part. The operations requirements can help inform whether a SEE will make a part experience a voltage, current, power, frequency, or the like within the invalid operation ranges.

LUTs 104 or 106 can be determined for regions along the trajectory 114A-114C between the origin 214 and the destination 216. The LUTs 104-106 indicate the LET in the corresponding region represented by the LUT 104-106. In FIG. 2, the LUTs 104-106 are represented by respective cells of a grid that represents the region 220 traversed by the device 202 in travelling from the origin 214 to the destination 216.

The trajectories 114A-114C can be split into time segments 218. The device 202 may not be travelling at a constant speed from the origin 214 to the destination 216. The time segments 218 can be of a same or different duration. The time segments 218 can be determined by operation 116. Note that a given LUT 104, 106 that is traversed by the trajectory 114A-114C can be applicable to one or more time segments 218.

The model 128 can identify the LUTs 104 or 106 traversed by the trajectory 114A-114C at operation 118. The operation 118 can include comparing a region covered by the LUTs 104, 106 to the trajectory 114A-114C. The operation 118 can include returning LUTs 104, 106 that overlap with the trajectory 114A-114C.

The simulation performed by the model 128 can provide a capability to evaluate SEEs as a result of the natural space environment. The simulation results can help inform whether a missile defense effector's flight path will experience an adverse SEE over time. The simulation performed by the model 128 can evaluate the probability of survivability at multiple hardware levels (e.g., system, unit, card, part). The simulation performed by the model 128 can represent multiple parts over a trajectory within a single simulation run. The simulation, as discussed, is compatible with HPC clusters and systems. The simulation performed by the model 128 can provide an ability to model both orbital and ballistic flight path trajectories within simulation over time. Embodiments can help evaluate a risk of SEEs for any space-based system, such as for the electronic design, including operational timelines, across a mission space.

Embodiments can provide output that summarizes results at a part, assembly, and payload level for each trajectory of the device 202. Embodiments can help provide a system-level understanding of a total fluence and peak flux potentially experienced by a device or a device design.

Figure 3:
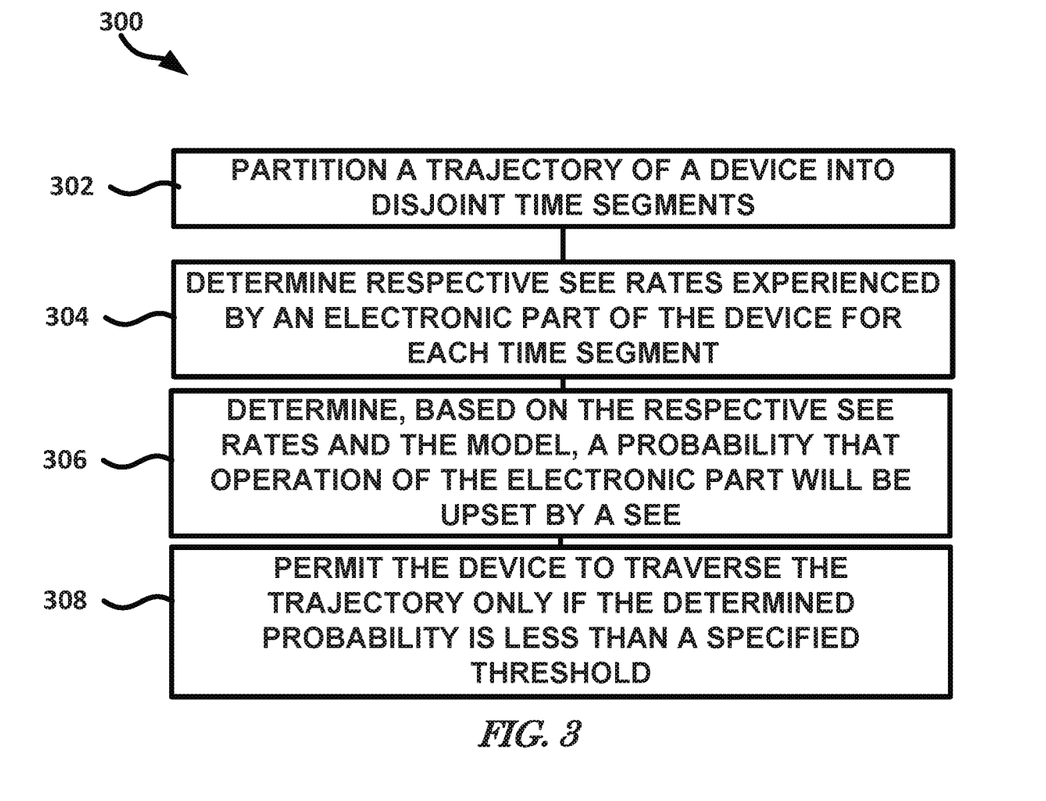
FIG. 3 illustrates, by way of example, a diagram of an embodiment of a method for natural space environment effect analysis.

FIG. 3 illustrates, by way of example, a diagram of an embodiment of a method 300 for natural space environment effect analysis. The method 300 can be implemented using one or more of the components or operations of FIG. 1, 2, or 4. The method 300 as illustrated includes partitioning (e.g., by processing circuitry 102 configured to implement a model 128 for determining a value representing a probability that operation of an electronic part 206, 208, 210 of a device 202 will be upset by a single event effect (SEE)) a trajectory of the device 202 into disjoint time segments 218, at operation 302; determining (e.g., based on an effective shielding 108 of the device 202 and one or more flux lookup tables (LUTs) 104, 106 for each of the time segments 218) respective SEE rates experienced by the electronic part 206, 208, 210 for each time segment 218, at operation 304; determining, based on the determined respective SEE rates and using the model, the probability, at operation 306; and permitting the device 202 to traverse the trajectory only if the determined probability is less than a specified threshold.

The time segments 218 can be of equal duration. The one or more LUTs 104, 106 can include, for each region traversed by the trajectory, a first LUT 104 that details direct flux encountered in the region and a second LUT 106 that details indirect flux encountered in the region. The respective SEE rates experienced by the electronic part 206, 208, 210 for each time segment are further determined based on whether the electronic part 206, 208, 210 is powered on or powered off during the time segment. The respective SEE rate can be zero (0) for times at which the electronic part is powered off.

The method 300 can further include determining, based on the effective shielding 108 of the device 202 and the one or more flux lookup tables (LUTs) 104, 106 for each of the time segments, respective SEE rates experienced by each of a plurality of electronic parts 206, 208, 210 on a board 204 of the device 202 for each time segment 218. The method 300 can further include determining, based on the determined respective SEE rates, a probability that operation of the board 204 will be upset by the SEE. The method 300 can further include permitting the device 202 to traverse the trajectory only if the determined probability that operation of the board 204 will be upset is less than a specified threshold.

The method 300 can further include determining, based on the effective shielding 108 of the device 202 and the one or more flux lookup tables (LUTs) 104, 106 for each of the time segments 218, respective SEE rates experienced by each of a plurality of electronic parts 206, 208, 210 of the device 202 for each time segment 218. The method 300 can further include determining, based on the determined respective SEE rates, a probability that operation of the device 202 will be upset by the SEE. The method 300 can further include permitting the device 202 to traverse the trajectory only if the determined probability that operation of the device 202 will be upset is less than a specified threshold.

The method 300 can further include determining the probability that operation of the board 204 will be upset by the SEE includes summing the SEE rates for all time segments 218 for all parts 206, 208, 210 of the board to generate a total SEE rate for the board 204. The method 300 can further include determining the probability that operation of the device 202 will be upset by the SEE includes summing the total SEE rate for all boards 204 of the device 202. The method 300 can further include re-designing the device 202 and re-executing the model 128 based on the re-design in response to determining the probability is greater than the threshold.

Figure 4:
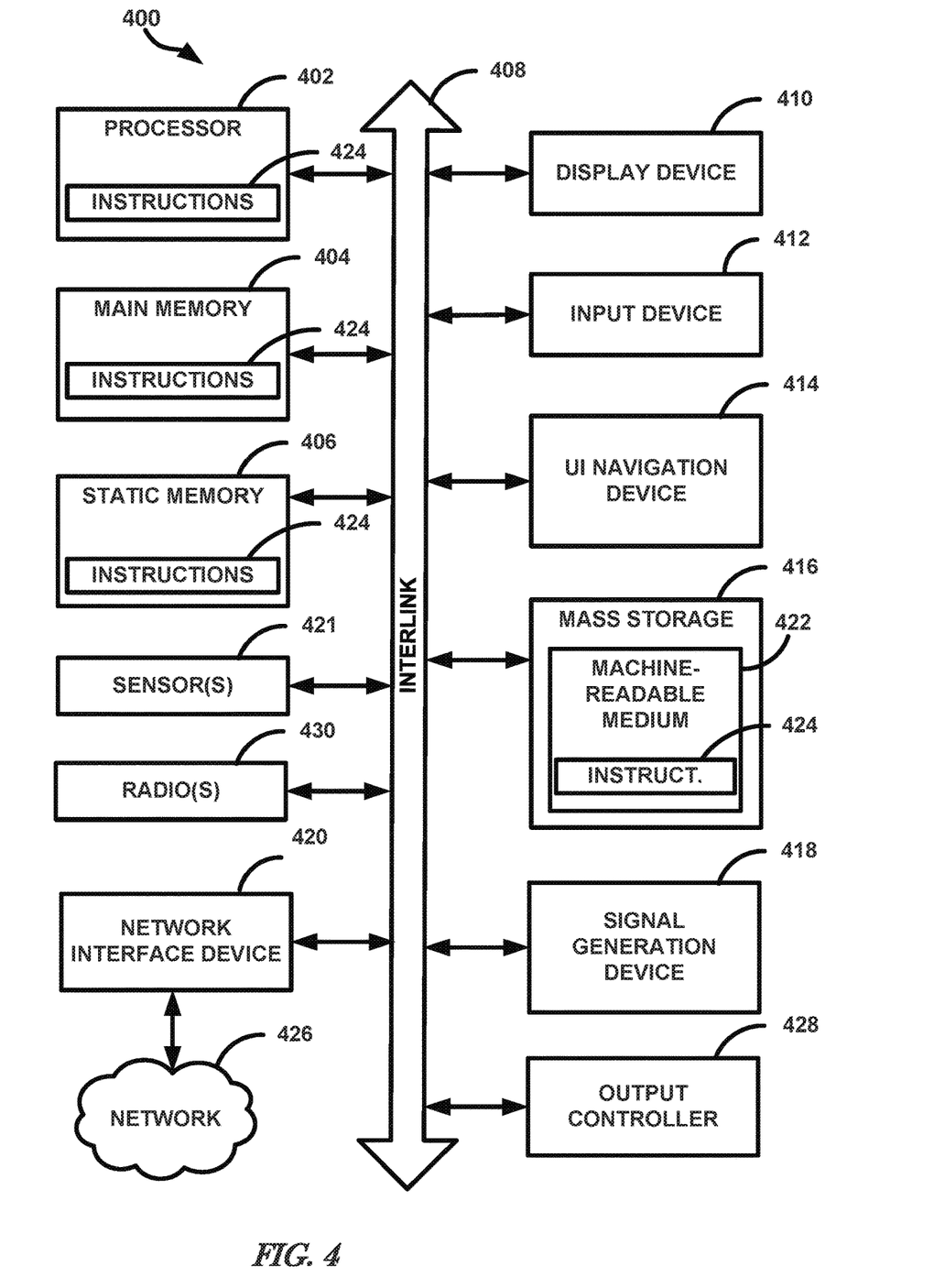
FIG. 4 illustrates, by way of example, a block diagram of an embodiment of a machine in the example form of a computer system within which instructions, for causing the machine to perform any one or more of the methodologies discussed herein, may be executed.

FIG. 4 illustrates, by way of example, a block diagram of an embodiment of a machine in the example form of a computer system 400 within which instructions, for causing the machine to perform any one or more of the methodologies discussed herein, may be executed. One or more of the processing circuitry 102, model 128, device 202, board 204, part 206, 208, 210, or operation 116, 118, 120, 122, 124 can be implemented using, or can include, one or more components of the system 400. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a mass storage unit 416, a signal generation device 418 (e.g., a speaker), a network interface device 420, and a radio 430 such as Bluetooth, WWAN, WLAN, and NFC, permitting the application of security controls on such protocols.

The mass storage unit 416 includes a machine-readable medium 422 on which is stored one or more sets of instructions and data structures (e.g., software) 424 embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 424 may further be transmitted or received over a communications network 426 using a transmission medium. The instructions 424 may be transmitted using the network interface device 420 and any one of a number of well-known transfer protocols (e.g., HTTP).

Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Examples

Example 1 can include a method comprising partitioning, by processing circuitry configured to implement a model for determining a value representing a probability that operation of an electronic part of a device will be upset by a single event effect (SEE), a trajectory of the device into disjoint time segments, determining, based on an effective shielding of the device and one or more flux lookup tables (LUTs) for each of the time segments, respective SEE rates experienced by the electronic part for each time segment, determining, based on the determined respective SEE rates and using the model, the probability, and permitting the device to traverse the trajectory only if the determined probability is less than a specified threshold.

In Example 2, Example 1 can further include, wherein the time segments are of equal duration.

In Example 3, at least one of Examples 1-2 can further include, wherein one or more LUTs include, for each region traversed by the trajectory, a first LUT that details direct flux encountered in the region and a second LUT that details indirect flux encountered in the region.

In Example 4, at least one of Examples 1-3 can further include, wherein the respective SEE rates experienced by the electronic part for each time segment are further determined based on whether the electronic part is powered on or powered off during the time segment.

In Example 5, Example 4 can further include, wherein the respective SEE rate is zero (0) for times at which the electronic part is powered off.

In Example 6, at least one of Examples 1-5 can further include determining, based on the effective shielding of the device and the one or more flux LUTs for each of the time segments, respective SEE rates experienced by each of a plurality of electronic parts on a board of the device for each time segment, determining, based on the determined respective SEE rates, a probability that operation of the board will be upset by the SEE, and permitting the device to traverse the trajectory only if the determined probability that operation of the board will be upset is less than a specified threshold.

In Example 7, Example 6 can further include determining, based on the effective shielding of the device and the one or more flux lookup tables (LUTs) for each of the time segments, respective SEE rates experienced by each of a plurality of electronic parts of the device for each time segment, determining, based on the determined respective SEE rates, a probability that operation of the device will be upset by the SEE, and permitting the device to traverse the trajectory only if the determined probability that operation of the device will be upset is less than a specified threshold.

In Example 8, Example 7 can further include, wherein determining the probability that operation of the board will be upset by the SEE includes summing the SEE rates for all time segments for all parts of the board to generate a total SEE rate for the board, and determining the probability that operation of the device will be upset by the SEE includes summing the total SEE rate for all boards of the device.

In Example 9, at least one of Examples 1-8 can further include re-designing the device and re-executing the model based on the re-design in response to determining the probability is greater than the threshold.

Example 10 includes a non-transitory machine-readable medium including instructions that, when executed by a machine, cause the machine to perform operations for determining a probability that operation of an electronic part of a device will be upset by a single event effect (SEE), the operations comprising partitioning a trajectory of the device into disjoint time segments, determining, based on an effective shielding of the device and one or more flux lookup tables (LUTs) for each of the time segments, respective SEE rates experienced by the electronic part for each time segment, determining, based on the determined respective SEE rates and using a model for determining a value representing a probability that operation of the electronic part of the device will be upset by the SEE, the probability, and providing an indication to allow the device to traverse the trajectory only if the determined probability is less than a specified threshold.

In Example 11, Example 10 can further include, wherein the time segments are of equal duration.

In Example 12, at least one of Examples 10-11 can further include, wherein one or more LUTs include, for each region traversed by the trajectory, a first LUT that details direct flux encountered in the region and a second LUT that details indirect flux encountered in the region.

In Example 13, at least one of Examples 10-12 can further include, wherein the respective SEE rates experienced by the electronic part for each time segment are further determined based on whether the electronic part is powered on or powered off during the time segment.

In Example 14, Example 13 can further include, wherein the respective SEE rate is zero (0) for times at which the electronic part is powered off.

Example 15 can include a system comprising memory storing data indicating operations for implementing a model for determining a probability that operation of an electronic part of a device will be upset by a single event effect (SEE), one or more flux lookup tables (LUTs), a trajectory of the device, and effective shielding of the device, and processing circuitry coupled to the memory, the processing circuitry configured to partition the trajectory into disjoint time segments, determine, based on the effective shielding and the one or more flux LUTs for each of the time segments, respective SEE rates experienced by the electronic part for each time segment, determine, based on the determined respective SEE rates and using the operations of the model, a probability that operation of the electronic part of the device will be upset by the SEE, the probability, and provide an indication to allow the device to traverse the trajectory only if the determined probability is less than a specified threshold.

In Example 16, Example 15 can further include, wherein the processing circuitry is further configured to determine, based on the effective shielding of the device and the one or more flux LUTs for each of the time segments, respective SEE rates experienced by each of a plurality of electronic parts on a board of the device for each time segment, determine, based on the determined respective SEE rates, a probability that operation of the board will be upset by the SEE; and provide an indication to permit the device to traverse the trajectory only if the determined probability that operation of the board will be upset is less than a specified threshold.

In Example 17, Example 16 can further include, wherein the processing circuitry is further configured to determine, based on the effective shielding of the device and the one or more flux LUTs for each of the time segments, respective SEE rates experienced by each of a plurality of electronic parts of the device for each time segment, determine, based on the determined respective SEE rates, a probability that operation of the device will be upset by the SEE, and provide an indication to permit the device to traverse the trajectory only if the determined probability that operation of the device will be upset is less than a specified threshold.

In Example 18, Example 17 can further include, wherein determining the probability that operation of the board will be upset by the SEE includes summing the SEE rates for all time segments for all parts of the board to generate a total SEE rate for the board, and determining the probability that operation of the device will be upset by the SEE includes summing the total SEE rate for all boards of the device.

In Example 19, at least one of Examples 15-18 can further include, wherein the processing circuitry is further configured to re-execute the model based on a re-design of the device in response to determining the probability is greater than the threshold.

In Example 20, at least one of Examples 15-19 can further include, wherein the respective SEE rates experienced by the electronic part for each time segment are further determined based on whether the electronic part is powered on or powered off during the time segment and the respective SEE rate is zero (0) for times at which the electronic part is powered off.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
    partitioning, by processing circuitry configured to implement a model for determining a value representing a probability that operation of an electronic part of a device will be upset by a single event effect (SEE), a trajectory of the device through a region into disjoint time segments;
    determining, based on an effective shielding of the device and flux lookup tables (LUTs) for each of the time segments, respective SEE rates experienced by the electronic part for each time segment;
    determining, based on the determined respective SEE rates and using the model, the probability is greater than a specified threshold;
    responsive to the determining, adjusting the trajectory or the device until the probability is less than the specified threshold resulting in a new device or a new trajectory, respectively; and
    (i) traversing, by the new device, the trajectory or (ii) traversing, by the device, the new trajectory.

2. The method of claim 1, wherein the time segments are of equal duration.

3. The method of claim 1, wherein the LUTs include, for each region traversed by the trajectory, a first LUT that details direct flux encountered in the region and a second LUT that details indirect flux encountered in the region.

4. The method of claim 1, wherein the respective SEE rates experienced by the electronic part for each time segment are further determined based on whether the electronic part is powered on or powered off during the time segment.

5. The method of claim 4, wherein the respective SEE rate is zero (0) for times at which the electronic part is powered off.

6. The method of claim 1, further comprising:
    determining, based on the effective shielding of the device and the flux LUTs for each of the time segments, respective SEE rates experienced by each of a plurality of electronic parts on a board of the device for each time segment;
    determining, based on the determined respective SEE rates, a probability that operation of the board will be upset by the SEE; and
    permitting the device to traverse the trajectory only if the determined probability that operation of the board will be upset is less than a specified threshold.

7. The method of claim 6, further comprising
    determining, based on the effective shielding of the device and the LUTs for each of the time segments, respective SEE rates experienced by each of a plurality of electronic parts of the device for each time segment;
    determining, based on the determined respective SEE rates, a probability that operation of the device will be upset by the SEE; and
    permitting the device to traverse the trajectory only if the determined probability that operation of the device will be upset is less than a specified threshold.

8. The method of claim 7, wherein:
    determining the probability that operation of the board will be upset by the SEE includes summing the SEE rates for all time segments for all parts of the board to generate a total SEE rate for the board; and
    determining the probability that operation of the device will be upset by the SEE includes summing the total SEE rate for all boards of the device.

9. The method of claim 1, further comprising:
    re-designing the device and re-executing the model based on the re-design in response to determining the probability is greater than the threshold.

10. A non-transitory machine-readable medium including instructions that, when executed by a machine, cause the machine to perform operations for determining a probability that operation of an electronic part of a device will be upset by a single event effect (SEE), the operations comprising:
    partitioning a trajectory of the device through a region into disjoint time segments;
    determining, based on an effective shielding of the device and flux lookup tables (LUTs) for each of the time segments, respective SEE rates experienced by the electronic part for each time segment;
    determining, based on the determined respective SEE rates and using a model for determining a value representing a probability that operation of the electronic part of the device will be upset by the SEE, the probability is greater than a specified threshold;

responsive to the determining, adjusting the trajectory or the device until the probability is less than the specified threshold, resulting in a new device or a new trajectory, respectively; and causing (i) the new device to traverse the trajectory or (ii) the device to traverse the new trajectory.

11. The non-transitory machine-readable medium of claim 10, wherein the time segments are of equal duration.

12. The non-transitory machine-readable medium of claim 10, wherein the LUTs include, for each region traversed by the trajectory, a first LUT that details direct flux encountered in the region and a second LUT that details indirect flux encountered in the region.

13. The non-transitory machine-readable medium of claim 10, wherein the respective SEE rates experienced by the electronic part for each time segment are further determined based on whether the electronic part is powered on or powered off during the time segment.

14. The non-transitory machine-readable medium of claim 13, wherein the respective SEE rate is zero (0) for times at which the electronic part is powered off.

15. A system comprising:
a device;
memory storing data indicating operations for implementing a model for determining a probability that operation of an electronic part of the device will be upset by a single event effect (SEE), flux lookup tables (LUTs), a trajectory of the device, and effective shielding of the device; and
processing circuitry coupled to the memory, the processing circuitry configured to:
partition the trajectory into disjoint time segments;
determine, based on the effective shielding and the flux LUTs for each of the time segments, respective SEE rates experienced by the electronic part for each time segment;
determine, based on the determined respective SEE rates and using the operations of the model, a probability that operation of the electronic part of the device will be upset by the SEE, the probability is greater than a specified threshold;
responsive to the determining, adjusting the trajectory or the device until the probability is less than the specified threshold resulting in a new device or a new trajectory, respectively; and
causing (i) the new device to traverse the trajectory or (ii) the device to traverse the new trajectory.

16. The system of claim 15, wherein the processing circuitry is further configured to:
determine, based on the effective shielding of the device and the flux LUTs for each of the time segments, respective SEE rates experienced by each of a plurality of electronic parts on a board of the device for each time segment;
determine, based on the determined respective SEE rates, a probability that operation of the board will be upset by the SEE; and
provide an indication to permit the device to traverse the trajectory only if the determined probability that operation of the board will be upset is less than a specified threshold.

17. The system of claim 16, wherein the processing circuitry is further configured to:
determine, based on the effective shielding of the device and the flux LUTs for each of the time segments, respective SEE rates experienced by each of a plurality of electronic parts of the device for each time segment;
determine, based on the determined respective SEE rates, a probability that operation of the device will be upset by the SEE; and
provide an indication to permit the device to traverse the trajectory only if the determined probability that operation of the device will be upset is less than a specified threshold.

18. The system of claim 17, wherein:
determining the probability that operation of the board will be upset by the SEE includes summing the SEE rates for all time segments for all parts of the board to generate a total SEE rate for the board; and
determining the probability that operation of the device will be upset by the SEE includes summing the total SEE rate for all boards of the device.

19. The system of claim 15, wherein the processing circuitry is further configured to re-execute the model based on a re-design of the device in response to determining the probability is greater than the threshold.

20. The system of claim 15, wherein the respective SEE rates experienced by the electronic part for each time segment are further determined based on Whether the electronic part is powered on or powered off during the time segment and the respective SEE rate is zero (0) for times at which the electronic part is powered off.

* * * * *